US010364827B2

(12) United States Patent
Humhauser et al.

(10) Patent No.: US 10,364,827 B2
(45) Date of Patent: Jul. 30, 2019

(54) GUIDE VANE RING, GUIDE VANE, INNER RING AND TURBOMACHINE

(71) Applicant: MTU Aero Engines AG, Munich (DE)

(72) Inventors: Werner Humhauser, Moosburg (DE); Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 553 days.

(21) Appl. No.: 14/672,333

(22) Filed: Mar. 30, 2015

(65) Prior Publication Data

US 2015/0275683 A1 Oct. 1, 2015

(30) Foreign Application Priority Data

Mar. 31, 2014 (DE) .................. 10 2014 205 986

(51) Int. Cl.
| | |
|---|---|
| *F01D 1/02* | (2006.01) |
| *F01D 9/04* | (2006.01) |
| *F01D 17/16* | (2006.01) |
| *F04D 29/08* | (2006.01) |
| *F04D 29/56* | (2006.01) |
| *F01D 7/00* | (2006.01) |
| *F01D 25/16* | (2006.01) |
| *F04D 29/32* | (2006.01) |

(52) U.S. Cl.
CPC ............. *F04D 29/563* (2013.01); *F01D 1/02* (2013.01); *F01D 7/00* (2013.01); *F01D 9/041* (2013.01); *F01D 17/162* (2013.01); *F01D 25/16* (2013.01); *F04D 29/083* (2013.01); *F04D 29/321* (2013.01); *F05D 2220/30* (2013.01); *F05D 2220/32* (2013.01); *F05D 2230/90* (2013.01); *F05D 2240/12* (2013.01); *F05D 2240/56* (2013.01); *Y02T 50/671* (2013.01)

(58) Field of Classification Search
CPC ... F01D 1/02; F01D 1/04; F01D 9/041; F01D 9/042; F01D 17/162; F01D 5/187; F01D 11/001; F01D 25/16; F01D 25/162; F01D 7/00; F04D 29/563; F04D 29/083; F04D 29/321; F05D 2230/90; F05D 2240/12; F05D 2240/56; F05D 2220/30; F05D 2220/32

See application file for complete search history.

(56) References Cited

U.S. PATENT DOCUMENTS

| 3,314,654 A | * | 4/1967 | Thenault | ............... | F01D 17/162 415/160 |
| 4,990,056 A | * | 2/1991 | McClain | ............... | F01D 11/001 29/889.22 |

(Continued)

FOREIGN PATENT DOCUMENTS

| DE | 28 10 240 C2 | 3/1978 |
| DE | 195 18 203 A1 | 12/1995 |

(Continued)

*Primary Examiner* — Carlos A Rivera
*Assistant Examiner* — Jesse M Prager
(74) *Attorney, Agent, or Firm* — Barlow, Josephs & Holmes, Ltd.

(57) ABSTRACT

An adjustable guide vane ring of a turbomachine having an inner ring, the guide vanes of which each have a radially inner vane disk with disk thickness increasing in the direction of flow and acting as a bearing pin; a guide vane, as well as an inner ring for such a guide vane ring, as well as a turbomachine are disclosed.

12 Claims, 3 Drawing Sheets

(56) References Cited

U.S. PATENT DOCUMENTS

| | | | |
|---|---|---|---|
| 5,421,703 A | 6/1995 | Payling | |
| 7,588,415 B2 | 9/2009 | Giaimo et al. | |
| 7,713,022 B2 * | 5/2010 | Major | F01D 17/162 |
| | | | 29/889.22 |
| 2006/0056963 A1 * | 3/2006 | Abadie | F01D 9/042 |
| | | | 415/191 |
| 2006/0110246 A1 * | 5/2006 | Bruce | F01D 17/162 |
| | | | 415/160 |
| 2007/0160464 A1 * | 7/2007 | Lesnevsky | C23C 4/04 |
| | | | 415/160 |
| 2012/0263571 A1 * | 10/2012 | Ress, Jr. | F01D 17/162 |
| | | | 415/1 |
| 2014/0234085 A1 | 8/2014 | Maliniak et al. | |

FOREIGN PATENT DOCUMENTS

| | | | |
|---|---|---|---|
| DE | 10225679 A1 * | 12/2003 | F01D 17/162 |
| DE | 10 2006 024 085 A1 | 11/2007 | |
| DE | 10 2009 004 934 A1 | 8/2010 | |
| DE | 10 2009 038 623 A1 | 3/2011 | |
| EP | 1312764 A2 | 5/2003 | |
| EP | 1 319 844 B1 | 6/2003 | |
| EP | 2696041 A1 | 2/2014 | |
| GB | 1 049 080 A | 11/1966 | |

\* cited by examiner

GUIDE VANE RING, GUIDE VANE, INNER RING AND TURBOMACHINE

BACKGROUND OF THE INVENTION

The invention relates to an adjustable guide vane ring for a turbomachine, a guide vane, and an inner ring for an adjustable guide vane ring, as well as a turbomachine according to the present invention.

For establishing optimal operating conditions, turbomachines such as aircraft engines and stationary gas turbines frequently have, on the compressor side, at least one adjustable row of guide vanes having a plurality of guide vanes that can be pivoted around their vertical axis. The row of guide vanes forms with an inner ring a so-called adjustable guide vane ring. The inner ring serves for stabilizing the guide vanes and has a plurality of radial openings or recesses, each of which takes up a bearing pin on the vane side. The outer bearing of the guide vanes as well as actuation thereof is carried out via adjusting pins of the guide vanes that interact with a corresponding adjustment means. Bearing bushes, into which the bearing pins are guided, are inserted into the openings or recesses of the inner ring. It is proposed in DE102006024085 A1 to form the inner ring from two ring segments with half-circle shapes and to roll these out individually over the bearing pins of the guide vanes mounted in the housing halves. For this purpose, the ring segments are pre-tensed to a constant tensioning radius, positioned in the region of the bearing pins and then the tension is relaxed. After rolling out the half-circle ring segments, a sealing support is pushed onto these segments. A demounting of the inner ring or of the guide vane ring takes place in a similar manner. The deforming and positioning of the inner ring segments can be carried out via a tensioning device shown in DE102009004934 A1.

An inner ring for an adjustable guide vane ring, which is divided axially and thus has a front ring segment and a back ring segment, considered in the direction of flow of a primary flow, is shown in EP1319844B1. Radial recesses for receiving bearing bushes and thus the bearing pins are formed as halves in each of the ring segments, and are joined to one another in a detachable manner via nut and bolt connections.

A guide vane ring, the guide vanes of which are mounted in depressions of an inner ring via a relatively short bearing pin is shown in GB 1 049 080 A. Further prior art is known from U.S. Pat. No. 7,588,415 B2, DE 195 18 203 A1, DE 10 2009 038 A1 and from DE 28 10 240 C2.

It has been shown, however, that the use of a guide vane ring in a turbomachine having a small or reduced structural space is made difficult or is not possible at all with these known constructions.

BRIEF SUMMARY OF THE INVENTION

The object of the invention is to create an adjustable guide vane ring for a turbomachine that makes its use possible in geometrically small compressors. It is also an object of the invention to create a guide vane as well as an inner ring for such a guide vane ring. Further, it is an object of the invention to create a turbomachine that has a geometrically small compressor having an adjustable guide vane ring.

This object is achieved by an adjustable guide vane ring, by a guide vane, by an inner ring, and by a turbomachine according to the present invention.

An adjustable guide vane ring of a turbomachine according to the invention has a plurality of guide vanes forming a row of guide vanes and an inner ring for stabilizing the row of guide vanes. The guide vanes each have a radially outer adjusting pin relative to a lengthwise axis of the guide vane ring for interacting with an adjusting means. Also, the guide vanes having radially inner vane disks are taken up in bearing recesses of the inner ring. According to the invention, the radially inner vane disks operate as bearing pins, whereby they and/or the bearing recesses are coated on their bearing surfaces and the vane parts have an overhang on the side of the back edge referred to their inner vane disk, and the radial height of the vane disks increases downstream of a primary flow.

The omitting of radially inner bearing pins and their bearing bushes, and instead of this, the direct bearing of the guide vanes via their inner vane disks in the inner ring makes it possible to form the inner ring with a reduced radial height in comparison to known inner rings, which makes possible its use in small compressors. In addition, leakage losses, weight and cost of the guide vane ring are reduced due to the reduced number of parts. By dispensing with bearing pins and bearing bushes, a radial structural space is obtained, which can serve, for example, for connection elements for joining the ring segments. The connection elements can thus be disposed so that there is easy access to them, and thus easy assembly is made possible. Coating the vane disk and/or bearing recesses on their bearing surfaces brings about a reduction in friction losses and an increase in stability. By increasing the height of the vane disk in the direction of primary flow, the annular space geometry is taken into consideration for the arrangement on the compressor side. The downstream overhang of the vane part relative to the inner vane disk also causes a small adjustment to greatly influence the flow.

In one example of embodiment, the radial height of the vane disk at the entry, i.e., the minimum thickness of the vane disk, amounts to between 15% and 30% of the diameter of the vane disk.

An outer peripheral surface of the vane disk acting as bearing surface is preferably cylindrical over its entire radial height. In this way, a step structure in the vane disk is avoided on the side of the outer periphery.

In order to equilibrate, for example, different heat expansions between the inner ring and the vanes, it is advantageous if the vane disks are distanced from the bottom of the bearing recesses. In this way, a clamping or jamming in the radial direction is prevented.

The guide vane ring can be easily assembled if the inner ring is axially divided in the direction of primary flow and has a front ring segment and a back ring segment and the bearing recesses are formed as halves in each segment. In this way, the guide vane ring can be assembled without elastic deformation of its inner ring. Of course, the ring segments can also be divided in the peripheral direction and the inner ring can have not only an axial division, but also a division on the peripheral side, and is thus composed of four ring bottom segments, for example.

Assembly of the ring segments can also be simplified if they each have at least one flange displaced radially inward relative to the bearing recesses for joining the segments together. A plurality of boreholes for receiving connection elements such as bolts and/or rivets can be formed in the flanges.

A radially inner flow around the inner ring by a secondary flow or a downstream mixing of the primary flow with a secondary flow can at least be reduced, if the back ring segment has downstream an end segment, for example one that is bent, pointing radially inward away from a segment surface on the side of primary flow. Preferably, the secondary flow exits from the respective vane disks on the intake side. Alternatively or additionally, the secondary flow can also exit from the respective vane disks on the discharge side.

The flowing around or mixing can be completely prevented in the region of the back ring segment, if a radial gap between the end segment and an opposite-lying rotor segment is closed off by a sealing device.

Preferably, the sealing device is secured in position by means of a retaining ring disposed on the inner ring. In this case, it is particularly advantageous if the retaining ring and the ring segments are joined with one another by the same connection elements, so that no additional connection means and also no separate assembly steps are necessary for the retaining ring. A separate pushing on or a sealing support to be separately pushed onto the inner ring is dispensed with.

In order to completely or nearly completely prevent a mixing of the primary flow with the secondary flow in a region upstream of the guide vane ring, the front ring segment can have an upstream projection for axial overlapping with a body section of an upstream row of rotating blades of the respective turbomachine.

A mixing of the secondary flow into the primary flow can be adjusted in a targeted manner, if secondary flow injections extend through the inner ring. The secondary flow injections can extend through the inner ring between the bearing recesses and/or also through the bearing recesses, whereby the vane disks are then provided with corresponding guide channels. In one example of embodiment, the guide channels are such that a secondary flow can be injected independently of the displacement angle or angle of incidence of the guide vanes. In an alternative example of embodiment, the guide channels are such that a secondary flow can be injected only in a specific range of angles of incidence. Additional aero advantages can result thereby.

The weight of the guide vane ring or the guide vanes can be reduced, for example, if at least several vane disks each have a hollow space. In order to avoid an intake of the flow into the hollow spaces, it is advantageous if the hollow spaces are introduced into a front surface of the vane disks lying opposite a bottom surface of the bearing recesses.

A preferred guide vane for an adjustable guide vane ring according to the invention is devoid of bearing pins, whereby vane disk surfaces act as bearing surfaces.

A preferred inner ring for a guide vane ring according to the invention has a plurality of bearing recesses for receiving vane disks of guide vanes, wherein at least the surfaces of the bearing recesses on the peripheral side act as bearing surfaces.

A preferred turbomachine at least has an adjustable guide vane ring according to the invention and thus enables a compact construction on the compressor side and, in addition to this, makes possible an easy assembly.

Other advantageous embodiment examples of the invention are the subject of additional dependent claims.

BRIEF DESCRIPTION OF THE DRAWINGS

Preferred examples of embodiment of the invention will be explained in more detail in the following on the basis of schematic representations. Herein.

DETAILED DESCRIPTION OF THE INVENTION

Figure 1:
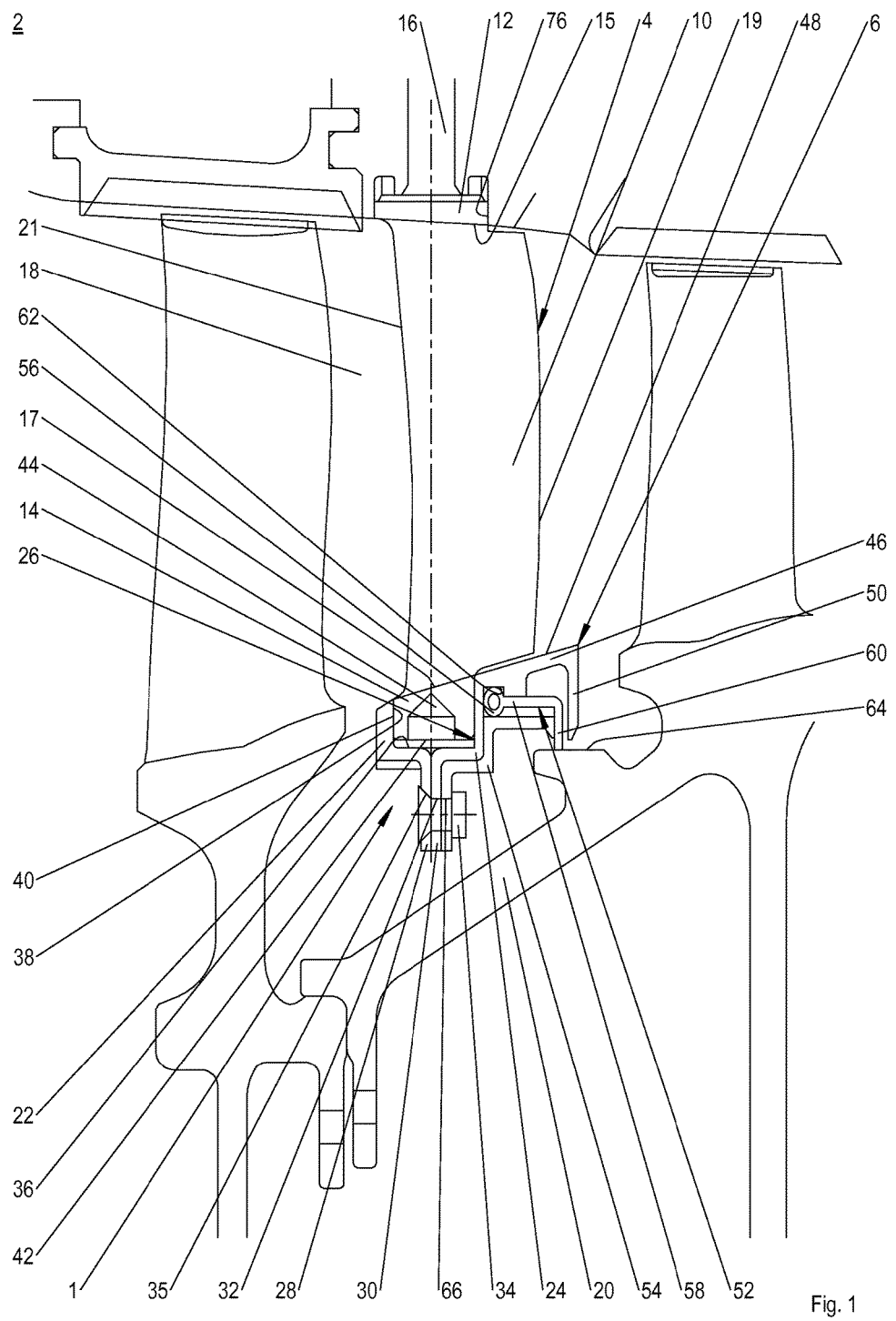
FIG. 1 shows a longitudinal section through a turbomachine in the region of a first exemplary embodiment of an adjustable guide vane ring.

According to the representation in FIG. 1, a first example of embodiment of a guide vane ring 1 according to the invention for a turbomachine 2, for example, an aircraft engine, has a plurality of guide vanes 4 and an inner ring 6. Here, the guide vane ring 1 is disposed on the compressor side and has, for example, up to 320 guide vanes 4. It is thus aligned in the turbomachine 2 such that it lies with its lengthwise ring axis on a lengthwise axis of the rotor or lengthwise axis of the turbomachine 2

The guide vanes 4 form a row of guide vanes and are adjustable around their vertical axis indicated by the dot-dash line and extending in the radial direction relative to the lengthwise axis of the ring. They each have a vane part 10, an outer vane disk 12, an inner vane disk 14, as well as an outer adjusting pin 16. The vane disks 12, 14 have a circular circumference and serve, by their opposite-lying disk surfaces 15, 17, for the radial limiting of an annular space 18 receiving the vane parts 10. A primary flow passes through the annular space 18 from left to right in the exemplary embodiment that is shown. Here, the primary flow is an air flow that is to be compressed. The vane parts 10 form an overhang on the side of the back edge and are thus disposed with their back edges 19 downstream of the inner vane disk 14. With their front edges 21 they are found axially "on" the inner vane disks 14. The adjusting pins 16 extend radially outward on the back side from the outer vane disks 12 relative to the lengthwise axis of the ring or the lengthwise axis of the turbomachine, and interact with an adjusting means (not shown) outside the annular space 18. According to the invention, the guide vanes 4 do not have bearing pins for the radial inner bearings and are thus devoid of bearing pins. The inner bearing of the guide vanes 4 interacts directly with the inner ring 6 via their inner vane disk 14 according to the invention. A detailed description of the inner vane disk 14 is given in the following.

The inner ring 6 surrounds a rotor section 20 of the turbomachine 2 and is radially distanced from the latter. It serves for radially inner stabilization of the guide vanes 4. It is axially divided and thus has an upstream or front ring segment 22 and a downstream or back ring segment 24 in the direction of the primary flow. The inner ring 6 has a plurality of bearing recesses 26, which are equally distanced from one another in the peripheral direction and are disposed in sections in the front ring segment 22 and the back ring segment 24.

The ring segments 22, 24 are closed over their periphery in the exemplary embodiment shown here and thus encompass an angle of 360°. For assembly or for forming the inner ring 6, they each have a radially inner-lying flange 28, 30, or flange ring relative to the bearing recesses 26, and a plurality of axial flange boreholes 32, each for taking up a connection element 34, is introduced into flange 28, 30, or the flange ring. Exemplary connection elements are screws, bolts and rivets, whose heads or nuts can be countersunk in a conical expansion 35 of the flange 28.

The bearing recesses 26 are formed as halves in the ring segments 22, 24. They serve for the uptake of the inner vane disk 14 and together with the latter, they form a radially inner bearing site in each case. They each have a bottom surface 36 and a semi-cylindrical inner peripheral surface 38. Based on the preferred arrangement in halves, each ring segment 22, 24 in this case forms a circumferential angle of 180°. The inner peripheral surfaces 32 of the bearing recesses 26 act together as cylindrical bearing surfaces and can be provided with a corresponding slip coating. The bottom surfaces 36 together form a circular base.

The inner vane disks 14 each have a cylindrical outer peripheral surface 40 over their entire radial height and these form the corresponding bearing surfaces, and in the assembled state are found in sliding contact with the inner peripheral surfaces 38 of the bearing recesses 26. Preferably, the outer peripheral surfaces 40 of the inner vane disk 14 are also provided with a slip coating. For reducing weight, a hollow space 44 extending in radial direction is introduced in a front surface 42 of the inner vane disk 14 facing the base of the bearing recess each time. The hollow space 44 is a blind borehole, for example. For the equilibration of different thermal length changes, for example, the vane disks in the assembled state are radially distanced from the base of the bearing recesses by their front surfaces 42.

The inner vane disks 14 operate as bearing pins. Here, their cylindrical outer peripheral surfaces 40 and the inner peripheral surfaces 38 of the bearing recesses 26 act as interacting bearing surfaces. Upstream, they have a short radial height, and downstream, a tall radial height. In this case, the height is measured from the front surface 42 up to disk surfaces 17, which bound the annular space 18. The inner vane disks 14 are thus wedge-shaped and follow the geometry of the annular space. With their front surfaces 42, they run in the direction of the lengthwise axis of the vane ring. Preferably, the disk surfaces 17 are elliptically shaped. In this exemplary embodiment, the radial height of the vane disk at the entry, i.e., the minimum thickness of the disk, amounts to between 15% and 30% of the vane disk diameter.

Downstream of the bearing recesses 26, the back ring segment 24 has an axial extension 46, and the vane parts 10 in each case are distanced via a gap (without a reference number) from the segment surfaces 48 of this extension on the side of the annular space or the side of the primary flow. The extension 46 transitions into an end section 50 pointing to or bent in the direction of the rotor section 20. The end section 50 thus extends radially inward away from, or on the back side of, the segment surface 48 on the side of the primary flow. The back ring segment 24 basically continues the diagonal skew of the disk surface 17 increasing in the direction of flow and thus terminates radially outside relative to the inner ring segment 22.

For sealing a gap between the rotor section 20 and the end section 50, a sealing device 52 is provided, which extends in peripheral direction and is disposed between the back ring segment 24 and a retaining ring 54. In particular, the sealing device 52 has a foot section 56, an axial connection section 58 and a sealing section 60 directed radially inward. The foot section 56 is expanded in cross section relative to the connection section 58 and clamped between the back ring segment 24 and the retaining ring 54, penetrating into an annular groove 62 of the back retaining ring 54. The connection section 58 extends between the foot section 56 and the sealing section 60 and thus joins the sealing section 60 to the foot section 56. The sealing section 60 is bent radially inward from the connection section 58 and has approximately the same cross section as the connection section 58. In the assembled state, it is found abutting the head side of a type of base surface 64 of the rotor section 20, and thus is in slip contact with it, so that the gap between the rotor section 20 and the end section 50 is fluidly closed.

The retaining ring 54 is guided close to the contour of the back ring segment 24 and has a plurality of boreholes 66, which have a division or distancing from one another on the peripheral side such that, in the assembled state, the boreholes 66 are positioned flush relative to the flange boreholes 32. In this way, the retaining ring 54 is joined at the back ring segment 24 to the connection elements 34, with which the ring segments 22, 24 are already joined to the inner ring 6.

Figure 2:
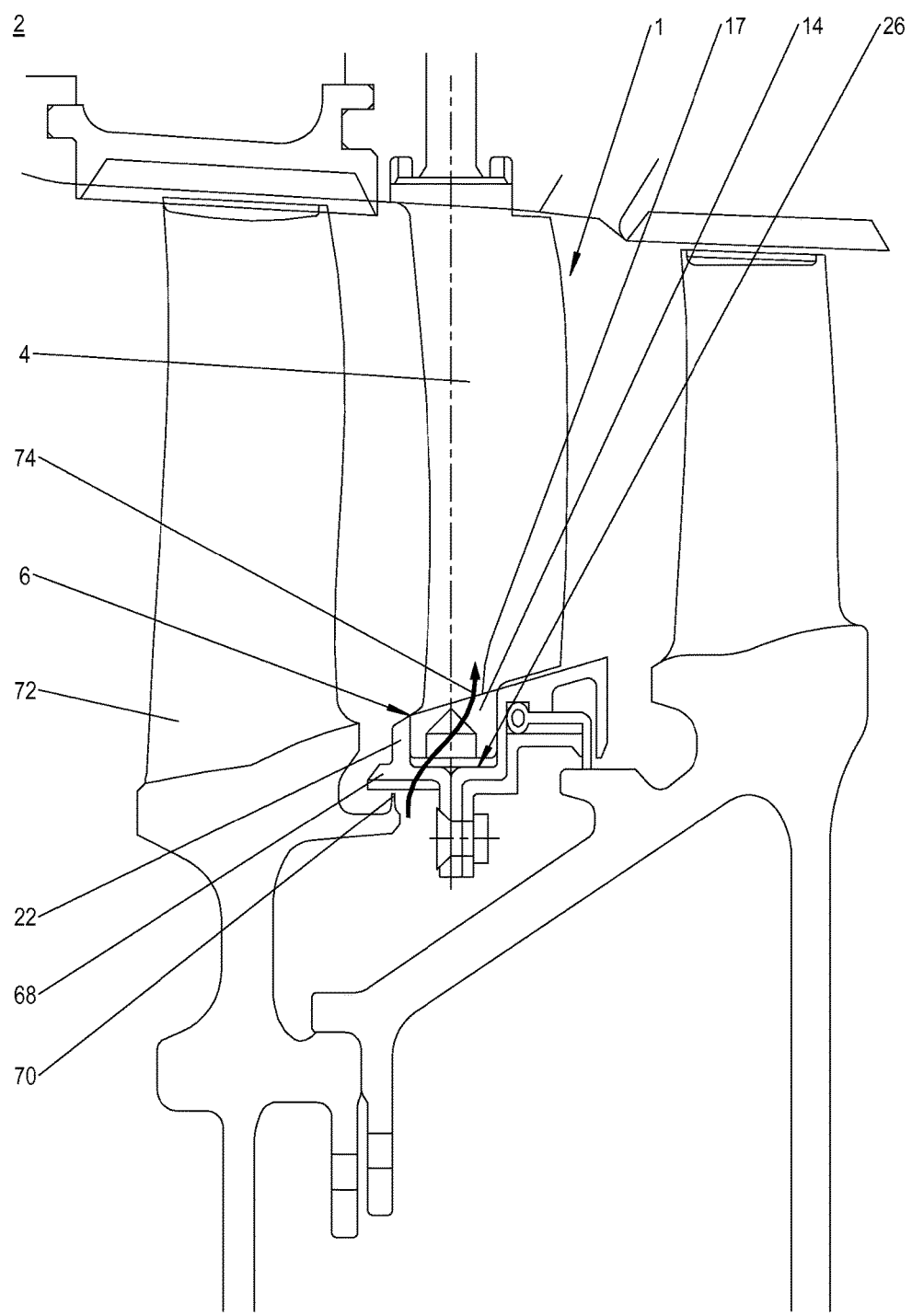
FIG. 2 shows a longitudinal section through a turbomachine in the region of a second exemplary embodiment of the adjustable guide vane ring according to the invention.

A second exemplary embodiment of the adjustable guide vane ring 1 according to the invention having guide vanes 4 free of bearing pins and an axially divided inner ring 6 mounted in a turbomachine 2 is outlined in FIG. 2. The differences between the first and the second examples of embodiment will be indicated in the following.

Unlike the first exemplary embodiment according to FIG. 1, in the case of the second exemplary embodiment according to FIG. 2, a front ring segment 22 of the inner ring 6 has an upstream projection 68 extending in peripheral direction. The projection 68 runs radially inward relative to bearing recesses 26 of the inner ring 6 and has an axial extension along a lengthwise axis of the vane ring or a lengthwise axis of the turbomachine, such that, in the assembled state, it is found in axial overlap with a sealing web 70 of an upstream row of rotating blades 72, the web rotating on the rotor side.

Figure 3:
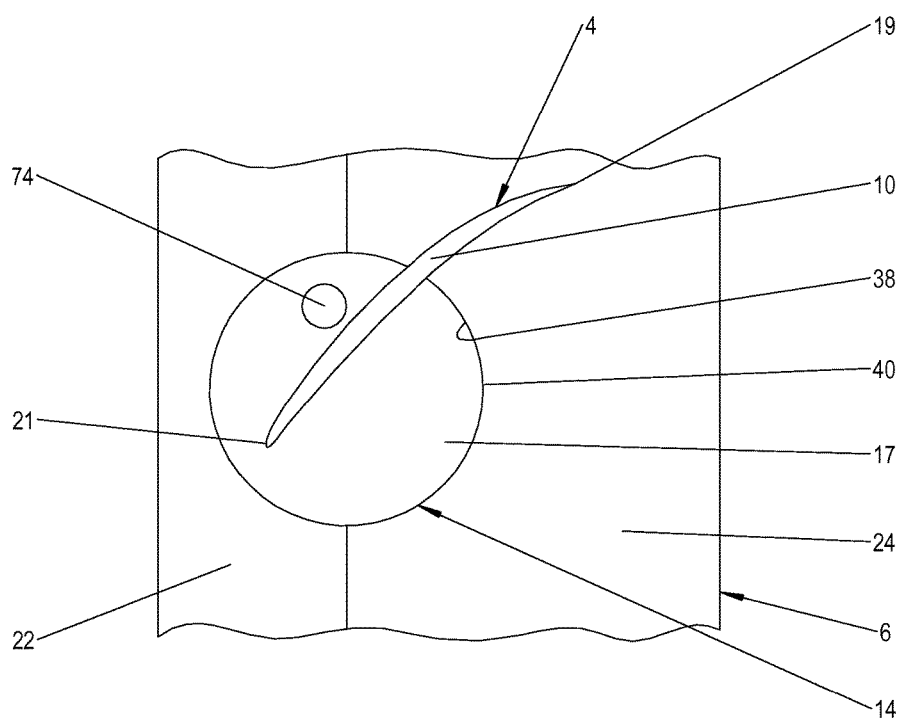
FIG. 3 shows a top view onto a bent peripheral section of the guide vane ring according to FIG. 2.

In another difference with respect to the first exemplary embodiment according to FIG. 1, in the case of the second exemplary embodiment according to FIG. 2, the inner ring 6 has a plurality of secondary flow injections 74 indicated by an arrow, for mixing leakage air or a secondary flow with the primary flow. The secondary flow injections 74 extend obliquely through the inner ring 6, wherein their radially inner inputs are each found upstream of their radially outer outputs. They are preferably formed in a region of the inner ring between the bearing recesses 28, but can also push through the inner vane disks 14 of the guide vanes 4. As shown in FIG. 3, the secondary flow injections 74 exit here from the inner vane disks 14 on the intake side. Their outlets are preferably circular for reasons of manufacturing techniques, but can also be oval, slotted, and the like. The geometry of the outlets is particularly aligned to the flow or aero effects to be achieved.

The assembly of the adjustable guide vane ring is carried out by inserting the guide vanes 4 by their adjusting pins into uptakes 76 on the housing side, which are provided for this purpose and numbered in FIG. 1, and subsequently tilting the front ring segment 22 and the back ring segment 24 with their bearing recess sections around the inner vane disk 14 of the guide vanes 4, with final screwing, riveting, connecting of pins, and the like. If the sealing device 52 is provided, it is positioned prior to screwing, given as an example, above the retaining ring 54, and the latter is then screwed together with the ring segments 22, 24, by means of the same connection elements 34.

An adjustable guide vane ring of a turbomachine having an inner ring, the guide vanes of which each have a radially inner vane disk with disk thickness increasing in the direction of flow and acting as a bearing pin; a guide vane, as well as an inner ring for such a guide vane ring, as well as a turbomachine are disclosed.

The invention claimed is:
1. An adjustable guide vane ring of a turbomachine, with a plurality of guide vanes forming a row of guide vanes and with an inner ring for stabilizing the row of guide vanes, wherein the guide vanes each have a radially outer adjusting pin relative to a lengthwise axis of the guide vane ring, the radially outer adjusting pin being adjustable, and wherein the guide vanes, each with a radially inner vane disk, are directly taken up in bearing recesses of the inner ring and being in direct communication with the inner ring with no bushes residing between the radially inner vane disk and the inner ring, wherein the radially inner vane disks have no bearing pin and act as bearing pins, the radially inner vane disks and/or the bearing recesses are coated on their bearing surfaces, and the guide vanes have an overhang on a side of a back edge past the radially inner vane disks, and a radial height of the radially inner vane disks increases downstream of a primary flow and the radial height of the radially inner vane disks upstream is between 15% and 30% of a diameter of the radially inner vane disks.

2. The adjustable guide vane ring according to claim 1, wherein the radially inner vane disks have a cylindrical bearing surface over their radial height.

3. The adjustable guide vane ring according to claim 1, wherein the vane disks are distanced from a base of the bearing recesses.

4. The adjustable guide vane ring according to claim 1, wherein the inner ring is divided axially and has a front ring segment and a back ring segment, in which the bearing recesses are formed as halves in each case.

5. The adjustable guide vane ring according to claim 4, wherein the ring segments each have at least one flange displaced radially inward relative to the bearing recesses, for joining the segments together.

6. The adjustable guide vane ring according to claim 4, wherein the back ring segment has downstream an end section directed radially inward from a segment surface on a side of a primary flow.

7. The adjustable guide vane ring according to claim 6, wherein a radial gap between the end section and an opposite-lying rotor section is closed by a sealing device.

8. The adjustable guide vane ring according to claim 7, wherein the sealing device is secured in position by a retaining ring disposed on the inner ring.

9. The adjustable guide vane ring according to claim 4, wherein the front ring segment has an upstream projection for axial overlapping a body section of an upstream row of rotating blades of the turbomachine.

10. The adjustable guide vane ring according to claim 1, wherein a secondary flow injection extends through the inner ring, this flow exiting from at least several of the vane disks on an intake side and/or a discharge side.

11. The adjustable guide vane ring according to claim 1, wherein at least several vane disks have a hollow space.

12. The adjustable guide vane ring according to claim 1, wherein the adjustable guide vane ring is employed in a turbomachine.

* * * * *